Jan. 20, 1942.  F. H. GULLIKSEN  2,270,799
ELECTRIC DISCHARGE APPARATUS
Filed March 31, 1939   5 Sheets-Sheet 1

WITNESSES:

INVENTOR
Finn H. Gulliksen.
BY
ATTORNEY

Jan. 20, 1942.   F. H. GULLIKSEN   2,270,799
ELECTRIC DISCHARGE APPARATUS
Filed March 31, 1939   5 Sheets-Sheet 2

WITNESSES:
E. A. McCloskey.
Hymen Diamond.

INVENTOR
Finn H. Gulliksen.
BY
F. W. Lyle.
ATTORNEY

Jan. 20, 1942.   F. H. GULLIKSEN   2,270,799
ELECTRIC DISCHARGE APPARATUS
Filed March 31, 1939   5 Sheets-Sheet 3

Conducting Periods of Tubes A and B.

Impulse Voltages of Tubes A and D.

Voltage Across $R_2$

Voltage $E_{C_1}$

WITNESSES:

INVENTOR
Finn H. Gulliksen,
BY
ATTORNEY

Jan. 20, 1942.  F. H. GULLIKSEN  2,270,799
ELECTRIC DISCHARGE APPARATUS
Filed March 31, 1939  5 Sheets-Sheet 4

WITNESSES:

INVENTOR
Finn H. Gulliksen.
BY
ATTORNEY

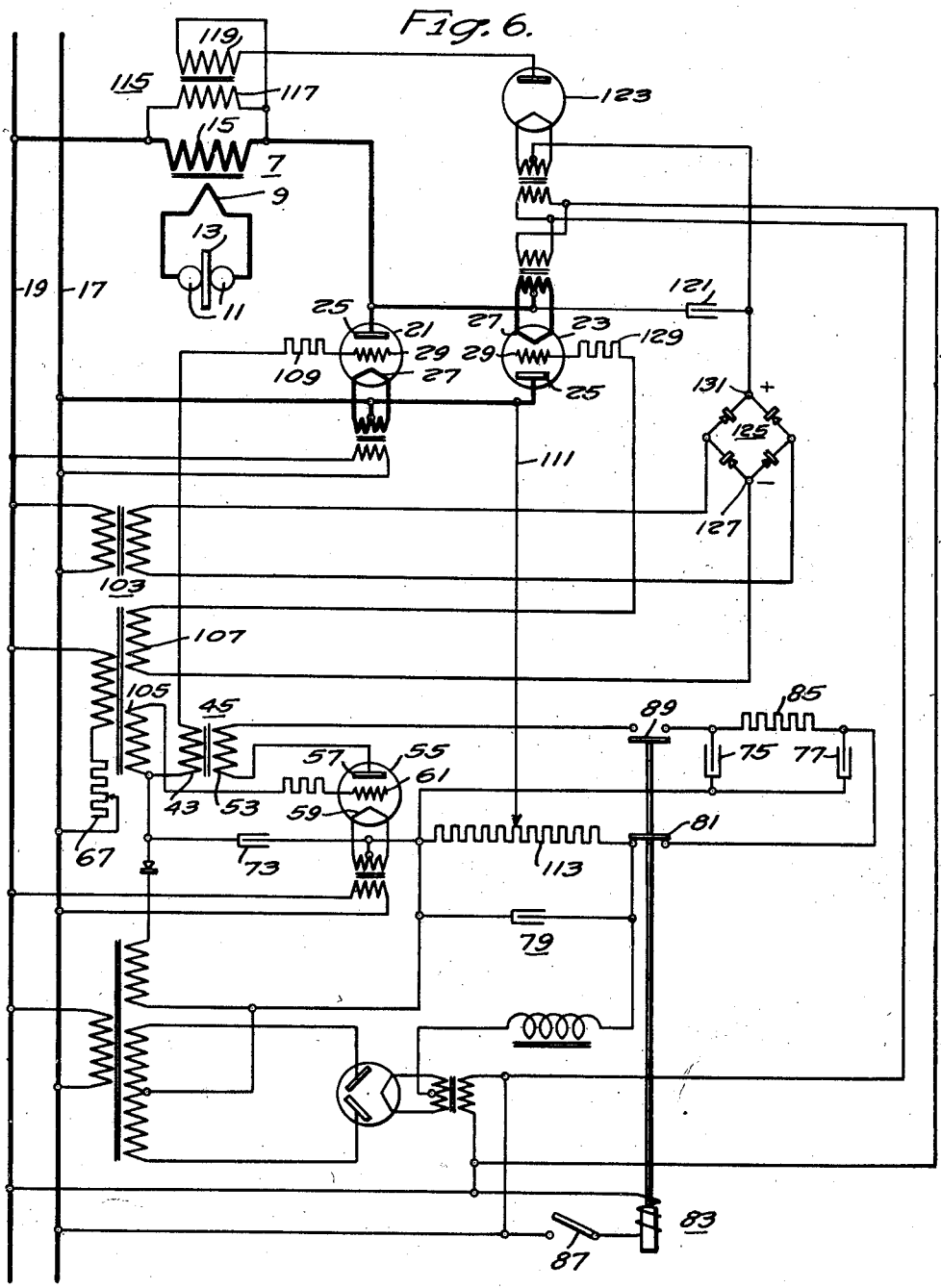

Patented Jan. 20, 1942

2,270,799

UNITED STATES PATENT OFFICE 2,270,799

ELECTRIC DISCHARGE APPARATUS

Finn H. Gulliksen, Pittsburgh, Pa., assignor to Westinghouse Electric & Manufacturing Company, East Pittsburgh, Pa., a corporation of Pennsylvania Application March 31, 1939, Serial No. 265,236

16 Claims. (Cl. 250—27)

My invention relates to electric discharge apparatus and has particular relation to welding apparatus.

In resistance spot and seam welding apparatus, it has been found that highly satisfactory results are produced by transmitting a plurality of successive half cycles of current from an alternating current source through the material to be welded. The number of half cycles selected for any particular case is determined by the time during which it is desired that welding current shall flow. To control the heat supplied to the weld, the current flow is initiated at predetermined instants in the conductive half periods. In accordance with the teachings of the prior art, the number of half cycles during which the current flows is determined by gradually charging or discharging a capacitor. The varying capacitor potential controls the conductivity of the valves through which the welding energy is supplied. By reason of the differences which exist in the control characteristics of the valves a variation in the capacitor potential does not always have the same effect on the conductivity of the valves and difficulties are often encountered in maintaining the timing of the welding current at precise values. The changes in the characteristics of the valves, of course, also often gives rise to unsatisfactory results as far as heat control is concerned.

An analysis of the difficulties leads to the conclusion that precise timing and satisfactory heat control can be attained with an arrangement in which the discharge or charge of the timing capacitor is abrupt. However, an arrangement of this type may involve intricate connections between the timing system and the main valves as the latter are, in general, connected in antiparallel. It is accordingly desirable to simplify the interconnection. This object may be accomplished by adopting the so-called follow-up control. In a system incorporating the follow-up control feature, one of the main valves is supplied with control potential from the load and is rendered conductive as the result of the conduction of current through the other main valve and the load. However, in the past, the use of a follow-up control system has proved undesirable because there was no known method of providing for heat control in the follow-up valve.

It is accordingly an object of my invention to provide a welding system of simple structure in which the timing potential shall be delivered in the form of sharp impulses.

A more general object of my invention is to provide for apparatus supplying a load that requires current in the form of discrete pulses, a predetermined number of half periods of an alternating current source in length, a timing arrangement that shall precisely determine the number of half periods during which current flows.

Another general object of my invention is to provide for apparatus supplying power from an alternating current source to a load in discrete impulses, a predetermined number of half periods of the source, in length, a time system by the operation of which the instants in the half periods when current flow is initiated shall be precisely determined.

A more specific object of my invention is to provide apparatus for supplying power from a source through electric discharge valves connected in a follow-up control circuit wherein the conductivity of each of the valves in its turn shall be initiated at precisely predeterminable instants in the periods of the supply source.

Another specific object of my invention is to provide welding apparatus, incorporating electric discharge valves connected in a follow-up circuit in which the initiation of the conductivity of the follow-up valve shall take place at angles to the half cycles corresponding to the heat control desired.

A further specific object of my invention is to provide a valve system for controlling the supply of alternating current from a source to a load that shall lead itself with facility to control from a timing system incorporating only a single output circuit.

More generally stated, it is an object of my invention to provide a welding system of simple structure with which precise timing and satisfactory heat control shall be attained.

According to my invention, impulses for rendering the main valves conductive are supplied through an auxiliary valve on which anode potential is impressed from a condenser of relatively small capacity. The condenser is discharged through the auxiliary valve once for each energizing impulse that is to be delivered to the main valves. It is recharged after each discharge from a condenser of large capacity. A resistor is connected in the charging circuit. The latter is sufficiently large compared to the impedance of the discharging circuit to prevent the large condenser from discharging through the auxiliary valve and sufficiently small to permit the small condenser to be charged from the large condenser in the interval of time between discharges.

The interconnection between the auxiliary valve and the main valves may be simplified by connecting a pair of rectifiers between the principal electrodes of the main valves. The rectifiers are connected back-to-back so that current flow in both directions is blocked. With the rectifiers in the system, the control electrodes of the main valves may be connected together and the energizing impulses from the auxiliary valve may be impressed between the common connection point of the control electrodes of the main valves and the junction point of the rectifiers.

By using the follow-up connection, an alternative simple arrangement is obtained. In accordance with my invention, however, the angle of firing of the follow-up valve is delayed to correspond to the heat control desired. For this purpose, a capacitor is charged from the load when it is supplied with current through the controlled valve. The capacitor is discharged at the instant at which the follow-up valve is to be rendered conductive through a suitable auxiliary valve and counteracts a bias in the control circuit of the follow-up valve to render the latter conductive. Alternatively, the capacitor, when charged, reduces the bias potential in the control circuit of the follow-up valve to a value such that the follow-up valve is rendered conductive by an impulse supplied at the proper instant.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which Figure 1 is a diagrammatic view showing an embodiment of my invention;

Fig. 6 is a diagrammatic view showing still another modification of my invention.

Figure 1:
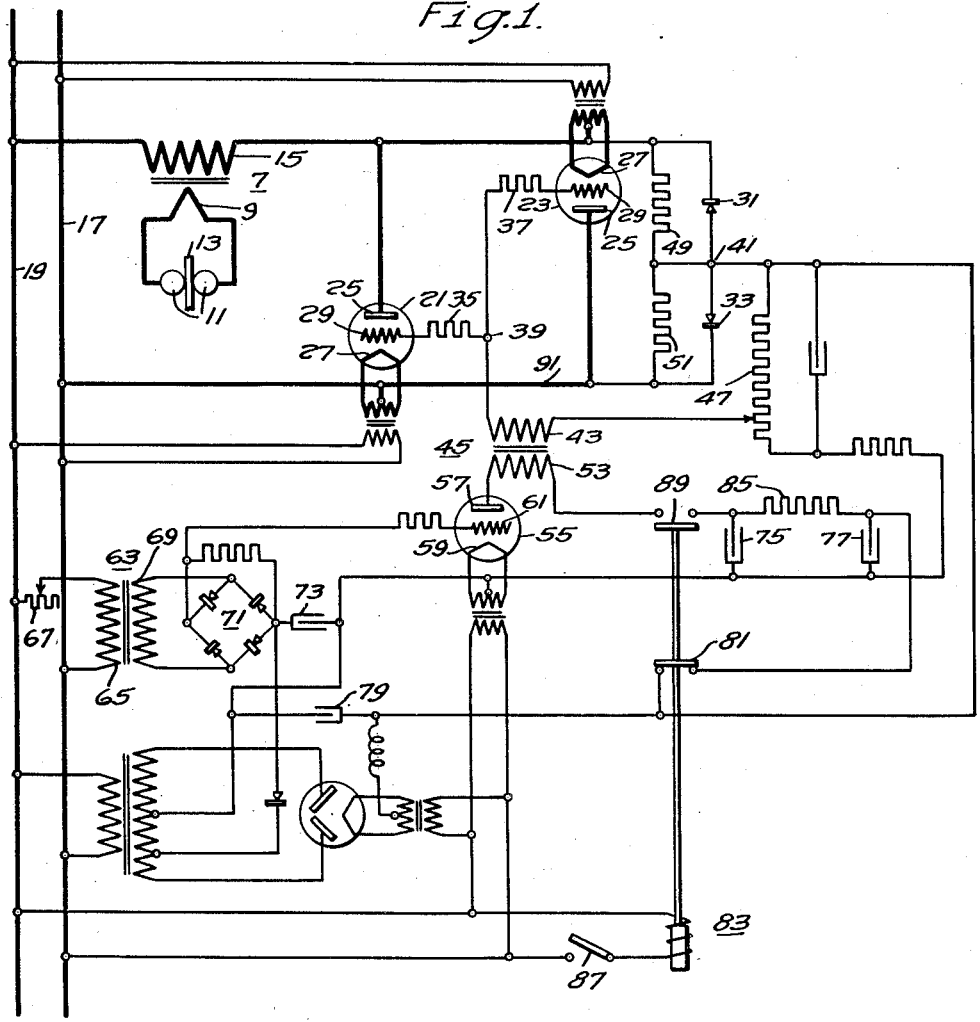

The apparatus shown in Fig. 1 comprises a welding transformer 7 across the secondary 9 of which a pair of welding electrodes 11 are connected. The electrodes are in engagement with a material 13 to be welded and when the transformer is energized, welding current flows through the material. The primary 15 of the welding transformer 7 is supplied with current from the line conductors 17 and 19 of a source of alternating current (not shown), which may be of the usual commercial 60-cycle type, through a pair of electric discharge valves 21 and 23 connected in anti-parallel. Each of the valves is of the arc-like type and comprises an anode 25, a hot cathode 27 and a control electrode 29.

While hot cathode valves are used in the apparatus disclosed in Fig. 1, valves of other types may also be used. For example, the hot cathode valves may be replaced by mercury pool valves and in particular by ignitrons. In such a case, the ignitrons may be connected in the same manner as the valves 21 and 23 with the ignition electrodes replacing the control electrodes 29.

A pair of rectifiers 31 and 33 which may be simple rectox elements of the copper-copper oxide type, interconnect the principal electrodes 25 and 27 of the valves 21 and 23. The rectifiers are connected back-to-back so that they prevent the passage of current in both directions. The control electrodes 29 of the valves 21 and 23 are connected together through suitable resistors 35 and 37 and their common connection point 39 is connected to the junction point 41 of the rectifiers 31 and 33 through the secondary 43 of a control transformer 45 and a biasing voltage divider 47. To provide for closed control circuits for each of the valves 21 and 23, resistors 49 and 51 of the grid leak type are connected in parallel with each of the rectifiers 31 and 33.

The primary 53 of the control transformer 45 is supplied with current through a timing valve 55 of the arc-like type having an anode 57, a cathode 59 and a control electrode 61. The timing valve 55 is supplied with control potential from a peaking transformer 63, the primary 65 of which is connected to the line conductors 17 and 19 through a rheostat 67 which presets the phase of the occurrence of the peaks relative to the source potential. The secondary 69 of the peaking transformer 63 is connected between the control electrode 61 and the cathode 59 of the timing valve 55 through a full-wave rectifier 71 and a biasing capacitor 73. Because of the presence of the rectifier 71, energizing impulses are provided in the control circuit of the timing valve 55 during each half cycle of the main source.

The timing valve 55 is rendered conductive during each half cycle during which current is to be supplied through the valves 21 and 23 and supplies an impulse through the control transformer to render one or the other of the valves conductive. To control the conductivity of the timing valve, a small condenser 75 and a large condenser 77 are provided. The large condenser 77 perferably has a capacity which is an integral multiple of the capacity of the small condenser 75. Prior to a welding operation, the large condenser 77 is connected to a direct current supply 79 derived from the main source through the normally closed contactor 81 of a starting relay 83, and is maintained fully charged. The small capacitor 75 is connected across the large capacitor 77 through a resistor 85 and is, therefore, also maintained charged before the welding operation is initiated. The resistor 85 is so small that if the small capacitor 75 is discharged, it is completely charged from the large capacitor 77 within a half period of the main source.

To initiate the welding operation, a circuit controller 87 which may be a pushbutton or a foot switch is closed and current is supplied to energize the starting relay 83. The charging circuit for the large capacitor 77 is, therefore, opened while at the same time the small capacitor 75 is directly connected to the primary 53 of the control transformer 45 through the normally open contactor 89 of the relay which is now closed. At an instant predetermined by the setting of the rheostat 67 in the primary circuit of the peaking transformer 63, the timing valve 55 is rendered conductive and the small capacitor 75 is discharged. The normal inductance in the discharging circuit of the small capacitor 75 is sufficient to cause the latter to charge slightly to the opposite polarity so that the timing valve is rendered non-conductive when the small capacitor is discharged.

The current flowing through the primary 53 of the control transformer 45 induces a potential impulse in the secondary 43 which is impressed between the control electrodes 29 and the cathodes 27 of the main valves 21 and 23 through the rectifiers. For the left hand main valve 21, the circuit in which the potential impulse is impressed extends from the left-hand terminal of the secondary 43 of the control transformer 45 through the grid resistor 35, the control electrode 29 and cathode 27 of the left-hand valve 21, a conductor 91, the lower rectifier 33, the biasing voltage divider 47 to the right-hand terminal of the secondary. The circuit for the other valve is the same but extends through the upper rectifier 31. One or the other of the main valves 21 or 23, depending on the polarity of the potential supplied from the line conductors 17 and 19, is now rendered conductive and supplies current to weld the material 13 during a half period of the source.

The resistor 85 between the two capacitors 75 and 77 is so large that when the auxiliary valve is rendered conductive, the large capacitor does not discharge through the auxiliary valve. However, it is so small that during the half period during which current flows through the main valve 21 or 23, the small capacitor is completely charged. Precisely a half period after the first impulse is impressed in the control circuit of the timing valve 55, a second impulse is impressed and the capacitor 75 is again discharged. This time the potential impulse supplied through the control transformer 45 renders the other main valve 23 or 21 conductive and an impulse of current is again supplied to the material 13 to be welded.

Since the charge on the large capacitor 77 is decreased by each discharge to the small capacitor 75, the potential impressed on the small capacitor decreases correspondingly after each discharge of the small capacitor. The impulses supplied to the primary 53 of the control transformer 45, therefore, decrease in amplitude as the potential impressed on the small capacitor 75 decreases. After a predetermined number of discharges of the small capacitor, the potential impulses impressed on the control transformer 45 become so small that they are insufficient to render the main valves 21 and 23 conductive and the welding operation is at an end.

Figure 2:
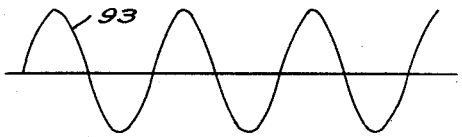
Figs. 2, 2a and 2b are graphs illustrating the operation of the timing system disclosed in Fig. 1.
Figure 2A:
Figure 2B:
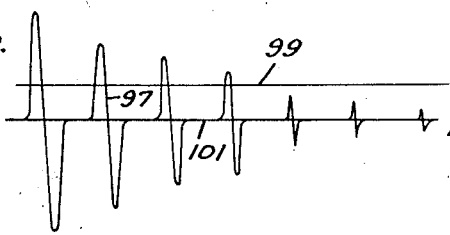

The operation of the apparatus is illustrated in Figs. 2, 2a and 2b. In each of the figures, potential is plotted vertically and time horizontally. The sine wave 93 in Fig. 2 represents the source potential. The peaked curves 95 in Fig. 2a represent the potential impulses supplied in the control circuit of the timing valve 55 through the rectifier 71 during each half cycle of the source. The peaked curves 97 in Fig. 2b, which gradually decrease in amplitude represent the potentials impressed across the secondary 43 of the control transformer 45 when the timing valve is rendered conductive. The horizontal line 99 above the abscissa 101 in Fig. 2b represents the critical control potential of the main valves 21 and 31. In the system, the operation of which is illustrated in Fig. 2b, four of the peaks 97 rise above the critical line 99 and, therefore, the main valves 21 and 23 supply current to the material during four successive half cycles of the source. By reason of the abrupt rise of the impulses, represented by the curves 97, small variations in the position of the critical line 99 do not produce any changes in the current flow through the material 13. Accordingly, any differences between the valves 21 and 23 which arise by reason of aging or any differences produced by replacement of valves do not change the calibration of the apparatus.

Figure 3:
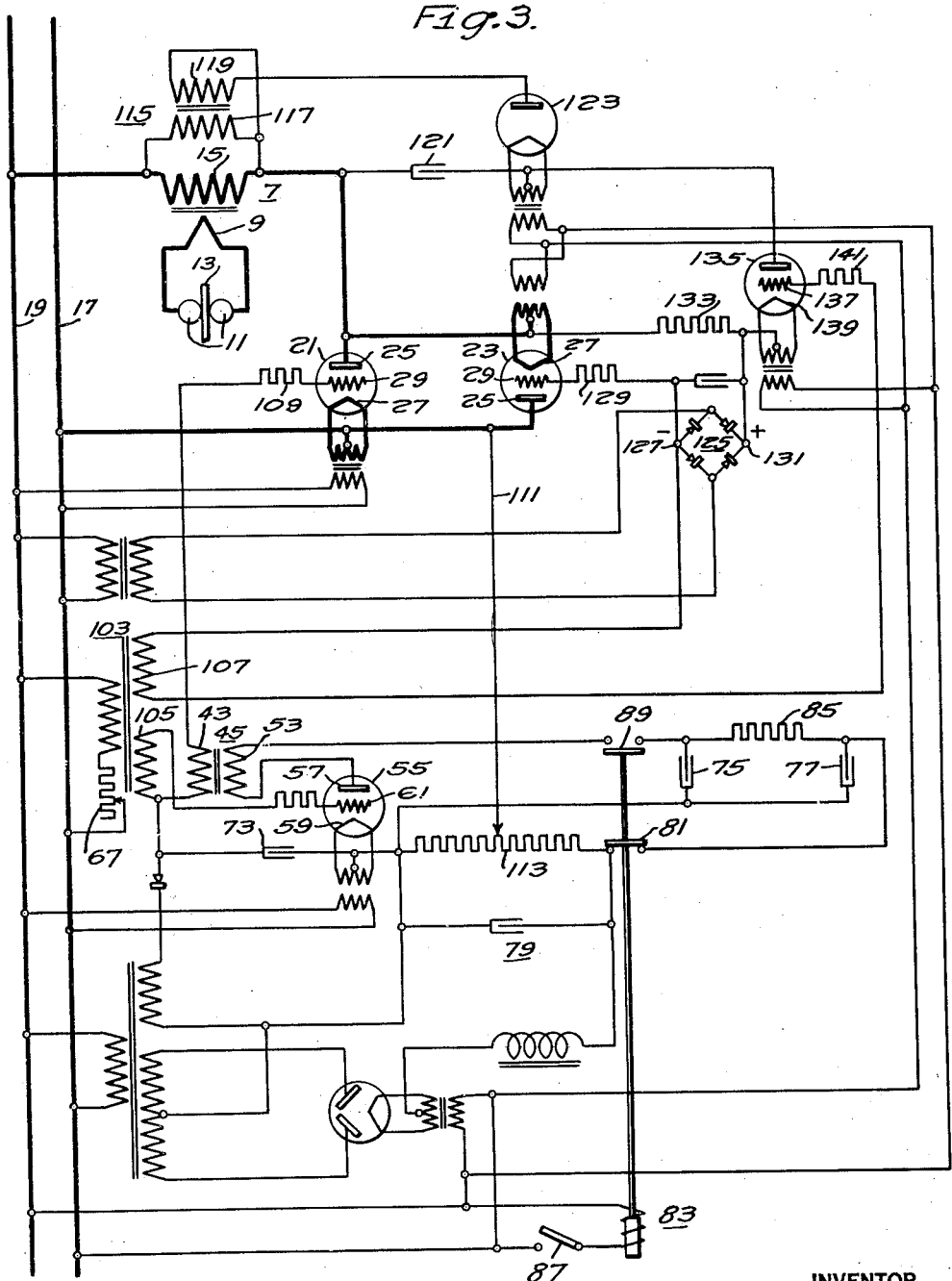
Fig. 3 is a diagrammatic view illustrating a modification of my invention.

In the apparatus shown in Fig. 3, the timing system used with the Fig. 1 apparatus is applied to a main valve system in which the follow-up circuit is incorporated. Since only one valve 21 is to be rendered conductive from the timing system only one impulse per cycle of the source need be supplied by the timing circuit, and the rectifier 71 is omitted from the control circuit of the timing valve 55. The peaking transformer 103 which is used in the Fig. 3 arrangement for supplying control impulses is provided with two secondary sections 105 and 107. One of the sections 105 is connected between the control electrode 61 and the cathode 59 of the timing valve 55 through the biasing capacitor 73.

The main valves 21 and 23 are connected in anti-parallel just as in the arrangement disclosed in Fig. 1. However, in the present case, only one of the valves, the leading valve 21, is supplied with control potential from the secondary 43 of the transformer 45 in series with the timing valve 55. The control circuit for the leading valve 21 extends from the upper terminal of the secondary 43 of the control transformer 45 through a grid resistor 109, the control electrode 29 and cathode 27 of the valve, a conductor 111, a voltage divider 113 energized from the direct current supply 79, the biasing capacitor 73 to the lower terminal of the secondary 43. The timing valve 55 is renderer conductive during alternate half cycles of the main source 17—19 by the impulses supplied through the peaking transformer 103 and when so rendered conductive discharges the small capacitor 77 and supplies impulses in the control circuit of the leading valve 21 to render the latter conductive. The leading valve supplies current through the primary of the welding transformer 7 and energy is supplied to the material 13.

To produce the potential necessary for rendering the follow-up valve 23 conductive, an auxiliary transformer 115 is provided. The primary 117 of the latter is connected across the primary 15 of the welding transformer. The secondary 119 of the auxiliary transformer 115 is connected across a capacitor 121 through a half-wave rectifier 123. When the primary 15 of the welding transformer 7 is supplied with current from the leading valve 21 which is rendered conductive from the timing system, the capacitor 121 is charged from the secondary 119 of the auxiliary transformer 115 through the rectifier 123 and the rectifier prevents the capacitor from subsequently discharging through the secondary.

The follow-up valve 23 is normally maintained non-conductive by a biasing source 125, the negative terminal 127 of which is connected to the control electrode 29 through a grid resistor 129 and the positive terminal 131 of which is connected to the cathode 27 through another resistor 133. The latter resistor 133 is also connected in series with the capacitor 121 through an auxiliary valve 135 of the arc-like type. The control electrode 137 of the auxiliary valve 135 is connected to the cathode 139 of the valve through a grid resistor 141, the secondary section 107 of the peaking transformer 103 and the biasing source 125 of the main valve. The connection of the secondary 107 is such that the impulses supplied in the control circuit of the auxiliary valve 135 by the peaking transformer 103 are of opposite polarity to the impulses supplied in the control circuit of the timing valve 55. Hence, while the timing valve 55 and the leading valve 21 are conductive, the other auxiliary valve is maintained non-conductive by the biasing source 125 in its control circuit. However, after current has been conducted through the leading valve 21 and the capacitor 121 has been charged, an impulse of potential is supplied in the control circuit of the auxiliary valve 135 at an instant predetermined by the rheostat 67 in the primary circuit of the peaking transformer 103 and the auxiliary valve 135 is rendered conductive. The capacitor 121 which was charged from the auxiliary transformer 115 is now discharged through the resistor 133 in series with the auxiliary valve 135 and the potential drop across the resistor is sufficient to counteract the biasing potential 125 and to render the follow-up valve 23 conductive. Current is now supplied through the material 13 to be welded for approximately a half period of source.

It is to be noted that the instant in the half period of the source at which the leading valve 21 is rendered conductive is predetermined by the setting of the rheostat 67 in the primary circuit of the peaking transformer 103 and the same is true of the instant at which the follow-up valve 23 is rendered conductive. It is seen accordingly that the initiation of the conductivity of both the leading valve 21 and the follow-up valve 23 is precisely controlled by the setting of the rheostat 67.

Figure 4:
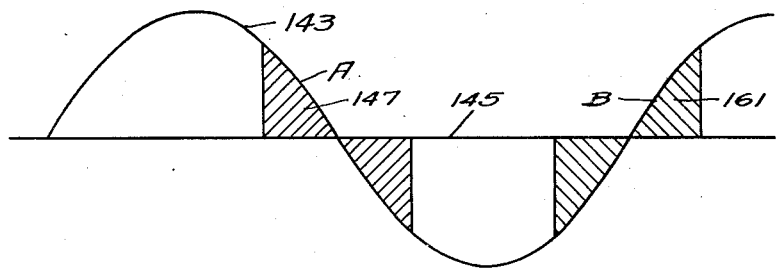
Figs. 4, 4a, 4b and 4c are graphs illustrating the operation of the follow-up control system in Fig. 3.

The operation of the apparatus is illustrated in Figs. 4, 4a, 4b and 4c. In each of the views, potential is plotted vertically and time horizontally. The sine wave 143 in Fig. 4 represents the potential supplied by the source 17—19. The portion of the sine wave 143 shown above the abscissa 145 represents positive anode-cathode potential impressed on the leading valve 21 and therefore the portion below the abscissa 145 represents positive anode-cathode potential impressed on the follow-up valve 23. The shaded area 147 near the end of the upper half wave and the beginning of the lower one represents the interval of time during which the leading valve 21 is conductive.

Figure 4A:
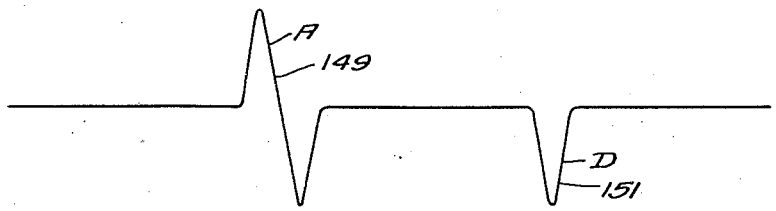
Figure 4B:

The potential supplied by the timing valve 55 is represented by the left-hand sharp wave 149 in Fig. 4a. The upper peak of this wave represents the potential impulse which renders the leading valve 21 conductive and, therefore, the shaded area 147 is shown as occurring at the same time as the upper peak. The single peak 151 on the right in Fig. 4a represents the impulse supplied by the peaking transformer 103 to the auxiliary valve 135.

Figure 4C:
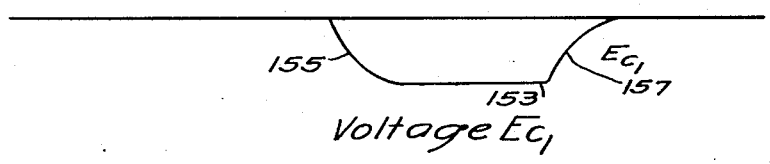

In Fig. 4c, a curve 153 representing the potential impressed across the capacitor 121 charged from the auxiliary transformer 115 is plotted. In correspondence with the branch 155 on the left and the control portion, the potential of the capacitor rises during the time that the leading valve 21 carries current and remains at its maximum value after the current flow through the leading valve ceases. At the time that the auxiliary valve 135 is rendered conductive, as is indicated by the right-hand peak 151 in Fig. 4a, the capacitor 121 is discharged, as represented by the right-hand branch 157 of the curve in Fig. 4c. The corresponding potential produced in the resistor 133 in series with the capacitor 121 is represented by the peaked curve 159 in Fig. 4b. The impulse potential represented by the curve 159 is impressed in the control circuit of the follow-up valve and renders the latter conductive for an interval of time represented by the right-hand shaded area 161 in Fig. 4.

Figure 5:
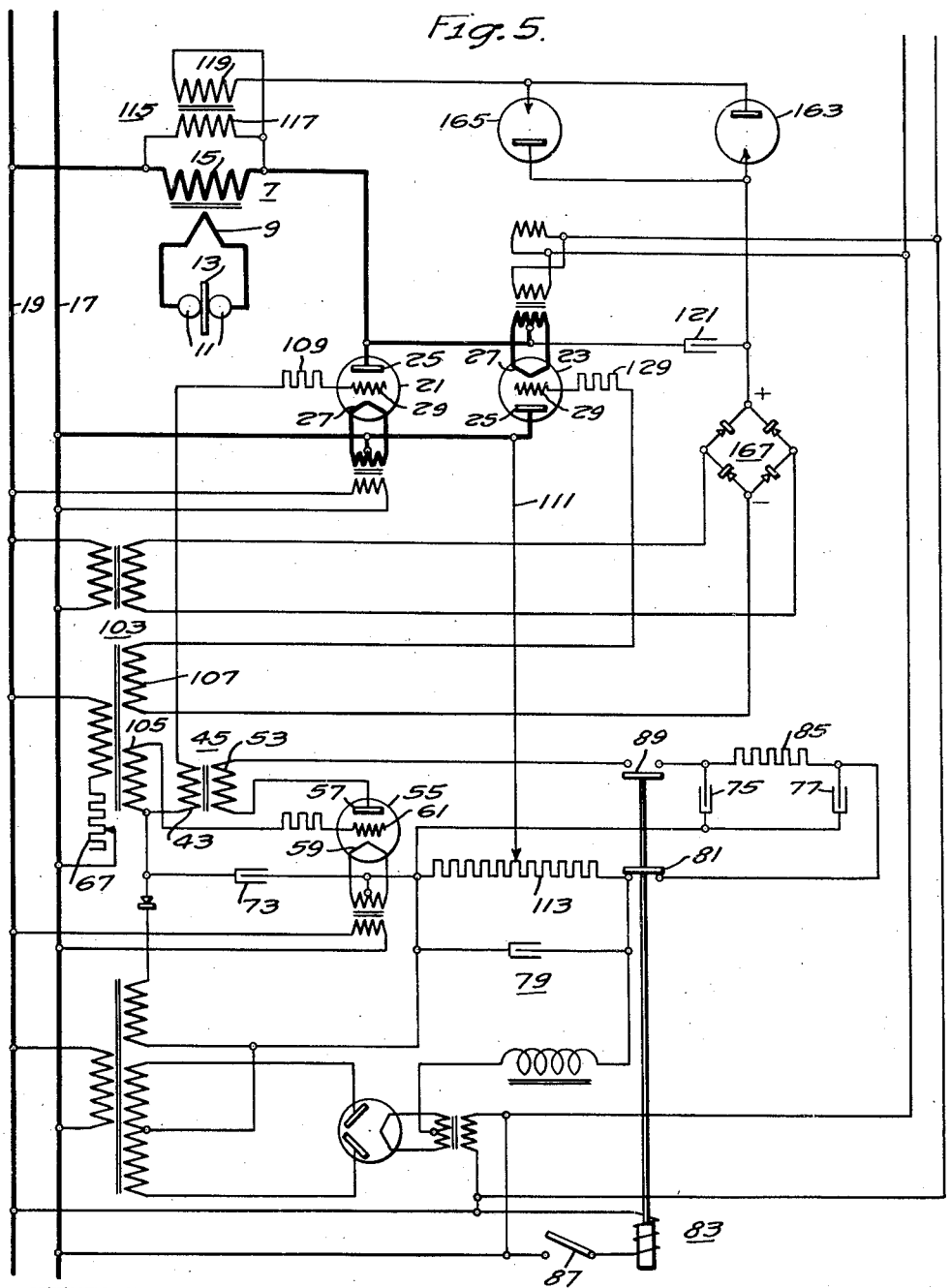
Fig. 5 is a diagrammatic view showing another modification of my invention.

The modification shown in Fig. 5 is similar to the Fig. 3 modification in that the timing arrangement is the same and the main valve arrangement is of the follow-up type. However, the circuit for the capacitor 121 supplied from the auxiliary transformer 115 is somewhat different. In this case, a pair of gaseous rectifiers 163 and 165 of the glow discharge type are connected in anti-parallel between the secondary 119 and the capacitor 121. The rectifiers 163 and 165 are preferably of the cold cathode type and have a breakdown value of the order of several hundred volts. The auxiliary transformer 115 is so designed that when the leading valve 21 is conductive, one of the rectifiers 163 becomes conductive and the capacitor 121 is charged. The capacitor 121 is connected between the control electrode 29 and the cathode 27 of the follow-up valve 23 in series with a biasing source 167 and the secondary section 107 of the impulsing transformer 103.

The biasing source 167 is of such magnitude that the sum of the capacitor potential plus the potential supplied from the peaking transformer 103 is insufficient to render the follow-up valve 23 conductive. The potential impressed on the capacitor 121 is of such polarity that it counteracts the biasing potential. Its magnitude is such that the sum of the capacitor potential plus the biasing potential is in itself not sufficient to render the follow-up valve conductive but the net potential is such that the impulses supplied by the peaking transformer now rise above the critical potential of the valve 23. Accordingly, at an instant predetermined by the setting of the rheostat 67, the follow-up valve 23 is rendered conductive. When current flows through the primary 15 of the welding transformer 7 by reason of the conduction of the follow-up valve 23, the auxiliary transformer 115 is again energized and causes the other rectifier 165 to become conductive and discharge the capacitor 121. The operation is repeated until the potential impressed on the smaller timing capacitor 75 is insufficient to render the timing valve 55 conductive.

The apparatus shown in Fig. 6 is similar to that shown in Figs. 3 and 5, but in this case the capacitor 121 controlling the follow-up valve 23 is charged through a rectifier 123 of the ordinary hot cathode or dry type as in the Fig. 3 arrangement and is discharged in the control circuit of the follow-up valve 23. The Fig. 6 arrangement can only be used, of course, in cases in which the critical potential of the follow-up valve 23 is somewhat greater than zero and the capacitor 121 is capable of being discharged in the control circuit.

It is to be noted that while my invention has been shown herein as applied to an arrangement in which the main valves are connected in anti-parallel, it should not be limited to this specific structure. My invention is applicable to an arrangement in which the valves are connected to conduct full wave direct current and where it is used in this manner the use falls within the scope thereof. This is particularly true of the follow-up circuit arrangement in accordance with my invention.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, an electric discharge valve having a plurality of principal electrodes, a first capacitor connected between said principal electrodes, a second capacitor, means for charging said second capacitor, means for charging said first capacitor from said second capacitor, means for rendering said valve conductive to discharge said first capacitor, said charging means for said first capacitor including means preventing the discharge of said second capacitor when said first capacitor is discharged, and means for rendering said charging means for said second capacitor ineffective when said means for rendering said valve conductive is effective.

2. In combination, an electric discharge valve of the arc-like type having a plurality of principal electrodes, a first capacitor connected between said principal electrodes, a second capacitor having a capacity large compared to that of said first capacitor, means for charging said second capacitor, means for charging said first capacitor from said second capacitor, means for rendering said valve conductive to discharge said first capacitor, said charging means for said first capacitor including means preventing the discharge of said second capacitor when said first capacitor is discharged, and means for rendering said charging means for said second capacitor ineffective when said means for rendering said valve conductive is effective.

3. In combination an electric discharge valve having a plurality of principal electrodes, a first capacitor connected between said principal electrodes, a second capacitor, means for charging said second capacitor, means for charging said first capacitor from said second capacitor, means for rendering said valve conductive to discharge said first capacitor, said charging means for said first capacitor including impedance means large compared to the impedance of the discharge circuit for preventing the discharge of said second capacitor when said first capacitor is discharged, and means for rendering said charging means for said second capacitor ineffective when said means for rendering said valve conductive is effective.

4. For use in supplying power from a source of alternating current to a load the combination comprising a pair of anti-parallel connected electric discharge valves interposed between said source and said load, each said valves having a control circuit, means for interconnecting the control circuit of one of said valves and said other valve in such manner that when said other valve is conductive the current flow through said other valve causes said one valve to become conductive in its turn, an auxiliary valve, of the arc-like type, a first capacitor connected across said auxiliary valve, a second capacitor having a capacity large compared to said first capacitor, means for charging said second capacitor, means for charging said first capacitor from said second capacitor, means for rendering said auxiliary valve conductive once during each cycle of said source to discharge said first capacitor, said charging means for said first capacitor including a resistance, large compared to the resistance in the discharge circuit of said first capacitor but small enough to permit said first capacitor to charge during a cycle of said source, to prevent said first capacitor from charging while it is being discharged, and means for deriving a potential from said discharging circuit of said first capacitor and impressing it in the control circuit of said other valve to render the latter conductive.

5. For use in supplying power from a source of alternating current to a load the combination comprising a pair of anti-parallel connected electric discharge valves interposed between said source and said load, each of said valves having a control circuit, means for interconnecting the control circuit of one of said valves and said other valve in such manner that when said other valve is conductive the current flow through said other valve causes said one valve to become conductive in its turn, means for impressing a potential in the control circuit of said other valve to initiate the conductivity of said other valve at predetermined instants in alternate half periods of said source and means for preventing said one valve from becoming conductive, as a result of the conduction of said other valve means, until predetermined instants in the remaining half periods of said source, said preventing means comprising charge storing means coupling to said interconnecting means in such manner as to be charged when current flows through said other valve, means for discharging said charge storing means at the instant in said remaining half periods at which said one valve is to be rendered conductive and means for deriving a potential from the discharge of said charge storing means and impressing said potential in the control circuit of said one valve to render said valve conductive.

6. For use in supplying a load with power from a source of alternating current the combination comprising a first discharge valve and a second discharge valve interposed between said load and said source in such manner as to conduct alternate half cycles of current from said source to said load, each said valves having a control circuit, means for impressing potential in the control circuit of said first valve to render said first valve conductive beginning at predetermined instants in the half periods of said source during which it can conduct, charge storing means, means for deriving a potential from said load when it is supplied through said first valve and impressing it to charge said charge storing means, means for discharging said charge storing means at predetermined instants in the half periods during which said second valve can conduct and means for deriving a potential from the discharge of said charge storing means and impressing it in the control circuit of said second valve to render said second valve conductive at said predetermined instants.

7. For use in supplying a load with power from a source of alternating current the combination comprising a first discharge valve and a second discharge valve interposed between said load and said source in such manner as to conduct alternate half cycles of current from said source to said load, each said valves having a control circuit, means for impressing potential in the control circuit of said first valve to render said first valve conductive beginning at predetermined instants in the half periods of said source during which it can conduct, charge storing means, means including current rectifying means in circuit with said charge storing means for deriving a potential from said load when it is supplied through said first valve and impressing it to charge said charge storing means, means including an auxiliary valve of the arc-like type for discharging said charge storing means at predetermined instants in the half periods during which said second valve can conduct and means for deriving a potential from the discharge of said charge storing means and impressing it in the control circuit of said second valve to render said second valve conductive at said predetermined instants.

8. For use in supplying power from a source of alternating current to a load the combination comprising a pair of electric discharge valves interposed between said source and said load in such manner as to conduct alternate half cycles of current from said source to said load, each of said valves having a control circuit, means for interconnecting the control circuit of one of said valves and said other valve in such manner that when said other valve is conductive the current flow through said other valve causes said one valve to become conductive in its turn, an auxiliary valve, of the arc-like type, a first capacitor connected across said auxiliary valve, a second capacitor having a capacity large compared to said first capacitor, means for charging said second capacitor, means for charging said first capacitor from said second capacitor, means for rendering said auxiliary valve conductive once during each cycle of said source to discharge said first capacitor, said charging means for said first capacitor including a resistance, large compared to the resistance in the discharge circuit of said first capacitor but small enough to permit said first capacitor to charge during a cycle of said source, to prevent said first capacitor from charging while it is being discharged, and means for deriving a potential from said discharging circuit of said first capacitor and impressing it in the control circuit of said other valve to render the latter conductive.

9. For use in supplying a load with power from a source of alternating current the combination comprising a first discharge valve and a second discharge valve interposed between said load and said source in such manner as to conduct alternate half cycles of current from said source to said load, each said valves having a control circuit, means for impressing potential in the control circuit of said first valve to render said first valve conductive beginning at predetermined instants in the half periods of said source during which it can conduct, charge storing means, means for deriving a potential from said load when it is supplied through said first valve impressing it to charge said charge storing means, means for impressing the potential on said storing means in the control circuit of said second valve to adapt said second valve to be rendered conductive, and means for impressing a potential in the control circuit of said second valve at predetermined instants in the half periods of the source during which it can conduct to render said second valve conductive.

10. For use in supplying a load with power from a source of alternating current the combination comprising a first discharge valve and a second discharge valve interposed between said load and said source in such manner as to conduct alternate half cycles of current from said source to said load, each said valves having a control circuit, means for impressing potential in the control circuit of said first valve to render said first valve conductive beginning at predetermined instants in the half periods of said source during which it can conduct, charge storing means, means for deriving a potential from said load when it is supplied through said first valve and impressing it to charge said charge storing means, means for impressing the potential on said storing means in the control circuit of said second valve to adapt said second valve to be rendered conductive, means for impressing a potential in the control circuit of said second valve at predetermined instants in the half periods of the source during which it can conduct to render said second valve conductive, and means coupled to said load for discharging said storing means when said second valve is conductive.

11. For use in supplying a load with power from a source of alternating current the combination comprising a first discharge valve and a second discharge valve interposed between said load and said source in such manner as to conduct alternate half cycles of current from said source to said load, each said valves having a control circuit and the control circuit of said second valve including a biasing potential maintaining the net control potential substantially below the critical value, means for impressing potential in the control circuit of said first valve to render said first valve conductive beginning at predetermined instants in the half periods of said source during which it can conduct, charge storing means, means for deriving a potential from said load when it is supplied through said first valve and impressing it to charge said charge storing means, means for impressing the potential on said storing means in the control circuit of said second valve to raise the net control potential to a value just below the critical potential, means for impressing another potential in the control circuit of said second valve at predetermined instants in the half periods of the source during which it can conduct to render said second valve conductive, and means coupled to said load for discharging said storing means when said second valve is conductive.

12. Apparatus according to claim 11 characterized by the fact that the deriving and charging means for the storing means includes a rectifier of the glow discharge type and the discharging means for the storing means includes another rectifier of the glow discharge type.

13. Apparatus according to claim 11 characterized by the fact that the biasing potential and the other potential are simultaneously impressed in the control circuit of said second valve but their magnitudes are such that their sum is less than the critical potential of said valve and that the said sum becomes greater than the said critical potential when the potential from the storing means is superimposed on the two potentials.

14. In combination, an electric discharge valve having a plurality of principal electrodes, a first capacitor connected between said principal electrodes, a second capacitor, means for charging said second capacitor at will, means for charging said first capacitor from said second capacitor, and means for discharging said first capacitor through said valve means at predetermined intervals when the charging of said second capacitor is interrupted, said charging means for said first capacitor including means preventing the discharge of said second capacitor when said first capacitor is discharged.

15. In combination, an electric discharge valve of the arc-like type having a plurality of principal electrodes, a first capacitor connected between said principal electrodes, a second capacitor having a capacity large compared to that of said first capacitor, means for connecting said second capacitor to a source of power for charging said second capacitor, means for charging said first capacitor from said second capacitor, and means effective when said second capacitor is disconnected from said source for rendering said valve conductive to discharge said first capacitor, said charging means for said first capacitor including means preventing the discharge of said second capacitor when said first capacitor is discharged.

16. In a system for supplying power from an alternating current source to a load, the combination comprising a main electric discharge valve interposed between said source and said load, said valve having a control circuit, an auxiliary valve of the arc-like type, a first capacitor connected across said auxiliary valve, a second capacitor having a capacity large compared to said first capacitor, means for charging said second capacitor, means for charging said first capacitor from said second capacitor, means for rendering said auxiliary valve conductive at least once during each cycle of said source to discharge said first capacitor, said charging means for said first capacitor including a resistance, large compared to the resistance in the discharge circuit of said first capacitor but small enough to permit said first capacitor to charge during a half cycle of said source, to prevent said first capacitor from charging while it is being discharged, and means for deriving a potential from said discharging circuit of said first capacitor and impressing it in the control circuit of said main valve.

FINN H. GULLIKSEN.